United States Patent
Hara

(10) Patent No.: US 11,334,289 B2
(45) Date of Patent: May 17, 2022

(54) CONTROL APPARATUS AND CONTROL METHOD

(71) Applicant: SHENZHEN TOREY MICROELECTRONIC TECHNOLOGY CO. LTD., Shenzhen (CN)

(72) Inventor: Yoshihide Hara, Sakai (JP)

(73) Assignee: SHENZHEN TOREY MICROELECTRONIC TECHNOLOGY CO. LTD., Shenzhen (CN)

(*) Notice: Subject to any disclaimer, the term of this patent is extended or adjusted under 35 U.S.C. 154(b) by 0 days.

(21) Appl. No.: 16/793,586

(22) Filed: Feb. 18, 2020

(65) Prior Publication Data

US 2020/0264809 A1 Aug. 20, 2020

Related U.S. Application Data

(60) Provisional application No. 62/808,102, filed on Feb. 20, 2019.

(51) Int. Cl.
G06F 3/06 (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0679; G06F 3/0604; G06F 3/061; G06F 3/064; G11C 16/08; G11C 16/10
See application file for complete search history.

(56) References Cited

U.S. PATENT DOCUMENTS

| | | | | |
|---|---|---|---|---|
| 9,251,891 | B1* | 2/2016 | Hu | G11C 16/26 |
| 2005/0005039 | A1* | 1/2005 | Saito | H04L 49/901 |
| | | | | 710/52 |
| 2007/0104038 | A1* | 5/2007 | Tamura | G11B 20/10 |
| | | | | 369/30.1 |
| 2007/0106835 | A1* | 5/2007 | Lin | G09G 5/363 |
| | | | | 711/103 |
| 2008/0205137 | A1* | 8/2008 | Yanagidaira | G11C 16/349 |
| | | | | 365/189.09 |
| 2014/0173268 | A1* | 6/2014 | Hashimoto | G11C 29/52 |
| | | | | 713/2 |
| 2015/0286593 | A1* | 10/2015 | Gans | G11C 7/1045 |
| | | | | 710/313 |
| 2018/0211695 | A1* | 7/2018 | Gans | G11C 7/1045 |
| 2019/0115078 | A1* | 4/2019 | Kim | G06K 9/6223 |
| 2019/0287635 | A1* | 9/2019 | Lee | G11C 16/3459 |
| 2020/0225873 | A1* | 7/2020 | Ock | G06F 3/0659 |
| 2020/0334098 | A1* | 10/2020 | Lee | G06F 11/0727 |

FOREIGN PATENT DOCUMENTS

JP 2015-025837 A 2/2015

* cited by examiner

*Primary Examiner* — Francisco A Grullon
(74) *Attorney, Agent, or Firm* — ScienBiziP, P.C.

(57) ABSTRACT

A control apparatus includes a storage that stores multiple parameters, a nonvolatile memory that is rewritable, and a control circuit that writes on the nonvolatile memory a target parameter from among the parameters. The parameter includes a parameter address indicating a storage location on the storage and at least one piece of parameter data. A control bit that is 0 or 1 is arranged in a parameter address or parameter data. The control circuit writes the parameter if the control bit is 1.

10 Claims, 6 Drawing Sheets

CONTROL APPARATUS AND CONTROL METHOD

TECHNICAL FIELD

The present invention relates to a control apparatus and a control method.

BACKGROUND ART

As a high-resolution design is introduced in display apparatuses and display apparatuses employing organic light emitting diode (OLED) appear, the number of parameters used in image displaying and the like on the display apparatus increases. The parameters of the display apparatus include a parameter related to a panel size and resolution, a parameter related to electrical characteristics of a panel and settings for driving timings of the panel, a correction parameter used in a correction operation that is used on image data to provide a high-resolution video, and other parameters.

The parameters described above are stored on a nonvolatile memory mounted in a driver IC (Integrated Circuit) in the display apparatus. When the parameters are set or updated by a user, the parameters stored on a storage (register) are written on a nonvolatile memory.

On-chip nonvolatile memories that have recently been available do not have a sufficient permissible write count even if the writing of the parameters is performed on each memory with the memory split into multiple groups. The challenge is writing a large quantity of parameters onto a limited memory area.

A display control apparatus having a nonvolatile memory that is able to store parameters different in maximum write count is disclosed (see Patent Literature 1). Referring to FIG. 6, the display control apparatus divides the parameters into groups with each parameter in the same group having the same maximum write count. Specifically, the display control apparatus may divide the parameters into a group 2a to which an address A and an address B belong and a group 2b to which an address C and an address D belong and may store the grouped parameters onto a storage 2.

CITATION LIST

Patent Literature

[PTL 1] Japanese Unexamined Patent Application Publication No. 2015-25837

SUMMARY OF INVENTION

Technical Problem

In the display control apparatus described above, a parameter at the address A may need to be updated while a parameter at the address B may not need to be updated. The parameter writing is performed on a per group basis. The parameter belonging to the address B that does not need to be updated is also written onto a nonvolatile memory 3.

The display control apparatus described above has a problem that the parameters on the storage 2 are written on the non-volatile memory 3 even if an update-free parameter or a parameter remaining valid in the default value thereof is included. An operation to write an update-free parameter involves reading the parameter from the non-volatile memory 3 to the storage 2 even if the parameter is update-free. This leads to an excessively long operation time.

The invention has been developed in view of the above problem and it is an object of the invention to provide a control apparatus and a control method for reducing write operation time of the parameters.

Solution to Problem (1) According to an embodiment of the invention, there is provided a control apparatus. The control apparatus includes a storage that stores multiple parameters, a nonvolatile memory that is rewritable, and a control circuit that writes on the nonvolatile memory a parameter serving as a write target from among the parameters. The parameter includes a parameter address indicating a storage location on the storage and at least one piece of parameter data. The parameter address or the parameter data includes a control bit that is 0 or 1. The control circuit writes the parameter on the nonvolatile memory if the control bit is 1.

(2) According to another embodiment of the invention, in addition to the configuration (1), the control circuit includes a write data control circuit and an address control circuit. The address control circuit reads an address in an unwritten area on the nonvolatile memory on which the parameter has been written and provides to the write data control circuit an instruction to read the parameter on the storage. The write data control circuit reads the parameter stored on the storage, and if the control bit of the read parameter is 1, the write data control circuit writes the read parameter at the address in the unwritten area on the nonvolatile memory.

(3) According to another embodiment of the invention, in addition to the configuration (1), the control bit is arranged on each of parameter addresses. The control circuit includes a write data control circuit and an address control circuit. The address control circuit reads an address in an unwritten area on the nonvolatile memory on which the parameter has been written and provides to the write data control circuit an instruction to read the parameter address on the storage. The write data control circuit reads the parameter address on the storage in response to the instruction from the address control circuit and if the control bit of the read parameter address is 1, the write data control circuit writes, at the address in the unwritten area on the nonvolatile memory, the read parameter address, the parameter data, and a total number of pieces of the parameter data.

(4) According to another embodiment of the invention, in addition to the configuration (1), the control bit is arranged on each piece of the parameter data. The control circuit includes a write data control circuit and an address control circuit. The address control circuit reads an address in an unwritten area on the nonvolatile memory on which the parameter has been written and provides to the write data control circuit an instruction to read the parameter data on the storage. The write data control circuit reads the parameter data on the storage in response to the instruction from the address control circuit and if the control bit of the read parameter data is 1, the write data control circuit writes, at the address in the unwritten area on the nonvolatile memory, the read parameter data, the parameter address, and a layout order of the parameter data.

(5) According to another embodiment of the invention, in addition to the configuration (3), the address control circuit retrieves the parameter address on the storage via the write data control circuit. The write data control circuit determines whether the parameter address on the storage is identical to the parameter address stored on the nonvolatile memory and, if the parameter address on the storage is identical to the parameter address stored on the nonvolatile memory, the write data control circuit overwrites the parameter address stored on the nonvolatile memory with a predetermined value.

(6) According to another embodiment of the invention, there is provided a control method of a control apparatus including a storage that stores multiple parameters, a nonvolatile memory that is rewritable, and a control circuit that writes on the nonvolatile memory a parameter serving as a write target from among the parameters. The control method includes an address reading step of reading an address in an unwritten area on the nonvolatile memory, on which the parameter has been written, the parameter including a parameter address indicating a storage location on the storage and at least one piece of parameter data, a parameter reading step of reading the parameter stored on the storage, a write determination step of determining with the control circuit, in accordance with a control bit that is 0 or 1 and arranged in the parameter address or the parameter data, whether to write the read parameter at the address in the unwritten area on the nonvolatile memory, and a write step of writing, if the control bit is 1, with the control circuit, the parameter read in the parameter reading step onto the nonvolatile memory.

(7) According to another embodiment of the invention, in addition to the configuration (6), the control circuit includes a write data control circuit and an address control circuit. In the address reading step, the address in the unwritten area on the nonvolatile memory on which the parameter has been written is read onto the address control circuit. In the parameter reading step, the address control circuit causes the write data control circuit to read the parameter on the storage. In the write determination step, if the control bit is 1, the write data control circuit writes at the address on the nonvolatile memory the parameter address read in the parameter reading step.

(8) According to another embodiment of the invention, in addition to the configuration (6), the control bit is arranged on each of parameter addresses. The control circuit includes a write data control circuit and an address control circuit. In the address reading step, the address in the unwritten area on the nonvolatile memory on which the parameter has been written is read onto the address control circuit. In the parameter reading step, the address control circuit causes the write data control circuit to read the parameter on the storage. In the write determination step, if the control bit is 1, a determination as to whether to write the parameter address read in the parameter reading step at the address on the nonvolatile memory is made. In the write step, the read parameter address, the parameter data, and a total number of pieces of the parameter data are written at the address on the nonvolatile memory.

(9) According to another embodiment of the invention, in addition to the configuration (6), the control bit is arranged on each piece of the parameter data. The control circuit includes a write data control circuit and an address control circuit. In the address reading step, the address in the unwritten area on the nonvolatile memory on which the parameter has been written is read onto the address control circuit. In the parameter reading step, the address control circuit causes the write data control circuit to read the parameter data on the storage. In the write determination step, if the control bit is 1, the parameter data read in the parameter reading step is written at the address in the unwritten area on the nonvolatile memory. In the write step, the read parameter data, the parameter address, and a layout order of the parameter data are written at the address on the nonvolatile memory.

(10) According to another embodiment of the invention, in addition to the configuration (8), the control method includes a parameter address reading step of reading the parameter address written on the nonvolatile memory, an overwrite determination step of determining whether the parameter address stored on the storage is identical to the parameter address stored on the nonvolatile memory, and an overwrite step of overwriting the parameter address on the nonvolatile memory with a predetermined value if the overwrite determination step has determined that the parameter address stored on the storage is identical to the parameter address stored on the nonvolatile memory.

Advantageous Effects of Invention

The control method and control apparatus according to an embodiment of the present invention reduce the write operation time of parameters.

DESCRIPTION OF EMBODIMENTS

First Embodiment

Figure 1:
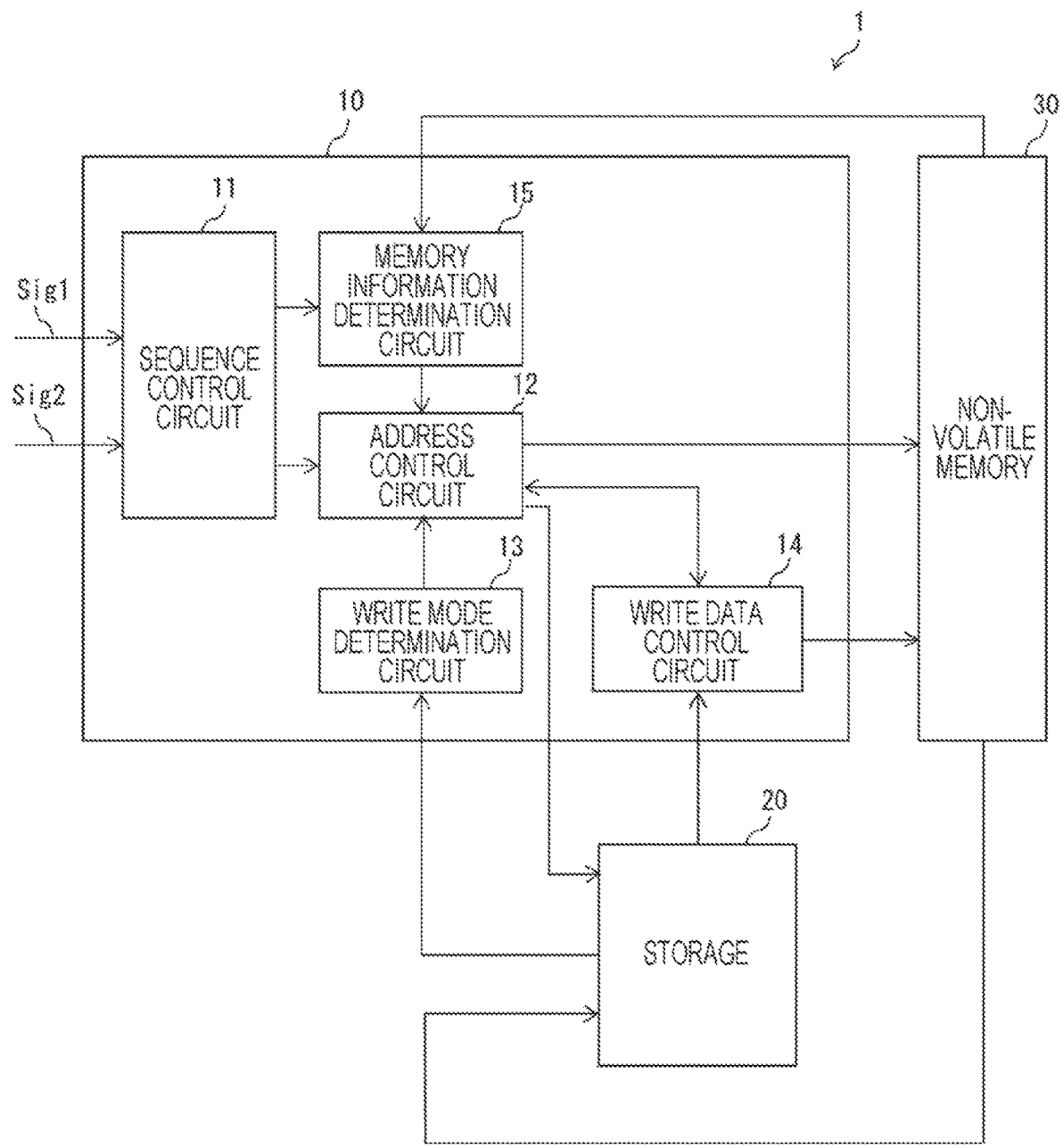
FIG. 1 is a block diagram of a control apparatus in accordance with a first embodiment of the invention.

A first embodiment of the invention is described with reference to FIGS. 1 through 3. For convenience of description, elements having an identical function are designated with the same reference numeral and the discussion thereof is omitted as appropriate.

[Control Circuit]

A control apparatus 1 of the first embodiment is arranged in a display driver IC in an unillustrated display apparatus. The control apparatus 1 includes a control circuit 10, storage 20, and nonvolatile memory 30.

The control circuit 10 includes a sequence control circuit 11, address control circuit 12, write mode determination circuit 13, write data control circuit 14, and memory information determination circuit 15. The control circuit 10 performs a write operation to write onto the nonvolatile memory 30 a parameter address, parameter data, and the like stored on the storage 20. The control circuit 10 also performs a load operation to successively read parameter data locations of data 32 on the nonvolatile memory 30 onto the storage 20 (see FIG. 1 and FIG. 2).

The sequence control circuit 11 receives a write start signal Sig1 and a load start signal Sig2. Upon receiving the write start signal Sig1, the sequence control circuit 11 instructs the memory information determination circuit 15 to retrieve an address 31 in an unwritten area on the nonvolatile memory 30. Upon receiving the load start signal Sig2, the sequence control circuit 11 performs a load operation to cause the address control circuit 12 to successively data 32 on the nonvolatile memory 30 onto the storage 20.

The address control circuit 12 retrieves the address 31 in the unwritten area on the nonvolatile memory 30 via the memory information determination circuit 15. Also, the address control circuit 12 instructs the write data control circuit 14 to read a parameter address on the storage 20.

The write mode determination circuit 13 instructs the address control circuit 12 to specify a write target. In accordance with the first embodiment, the parameter address on the storage 20 serves as the write target. The write target is set by user operation setting. In this way, the user flexibly controls a write operation count.

The write data control circuit 14 retrieves, from the memory information determination circuit 15, information on the address 31 in the unwritten area on the nonvolatile memory 30. In response to the instruction from the address control circuit 12, the write data control circuit 14 reads the parameter address on the storage 20 and determines whether the read parameter address is a write target.

Specifically, the write data control circuit 14 performs a write operation if the control bit 21 arranged at each parameter address is "1" and does not perform a write operation if the control bit 21 arranged at each parameter address is "0". In accordance with the first embodiment, the parameter address, parameter data, and the like, serving as the write target, are transmitted to the write data control circuit 14.

The memory information determination circuit 15 transmits the address 31 in the unwritten area on the nonvolatile memory 30 to the write data control circuit 14 via the address control circuit 12.

[Storage]

The storage 20 is a register that stores the parameter data related to a variety of parameters. For example, the parameters of the first embodiment include a correction parameter related to image data that is output to a display panel, a parameter related to the size and resolution of the display panel, a parameter related to the electrical characteristics and driving timing of the display panel, a parameter related to a test function, and other parameters.

Figure 2:
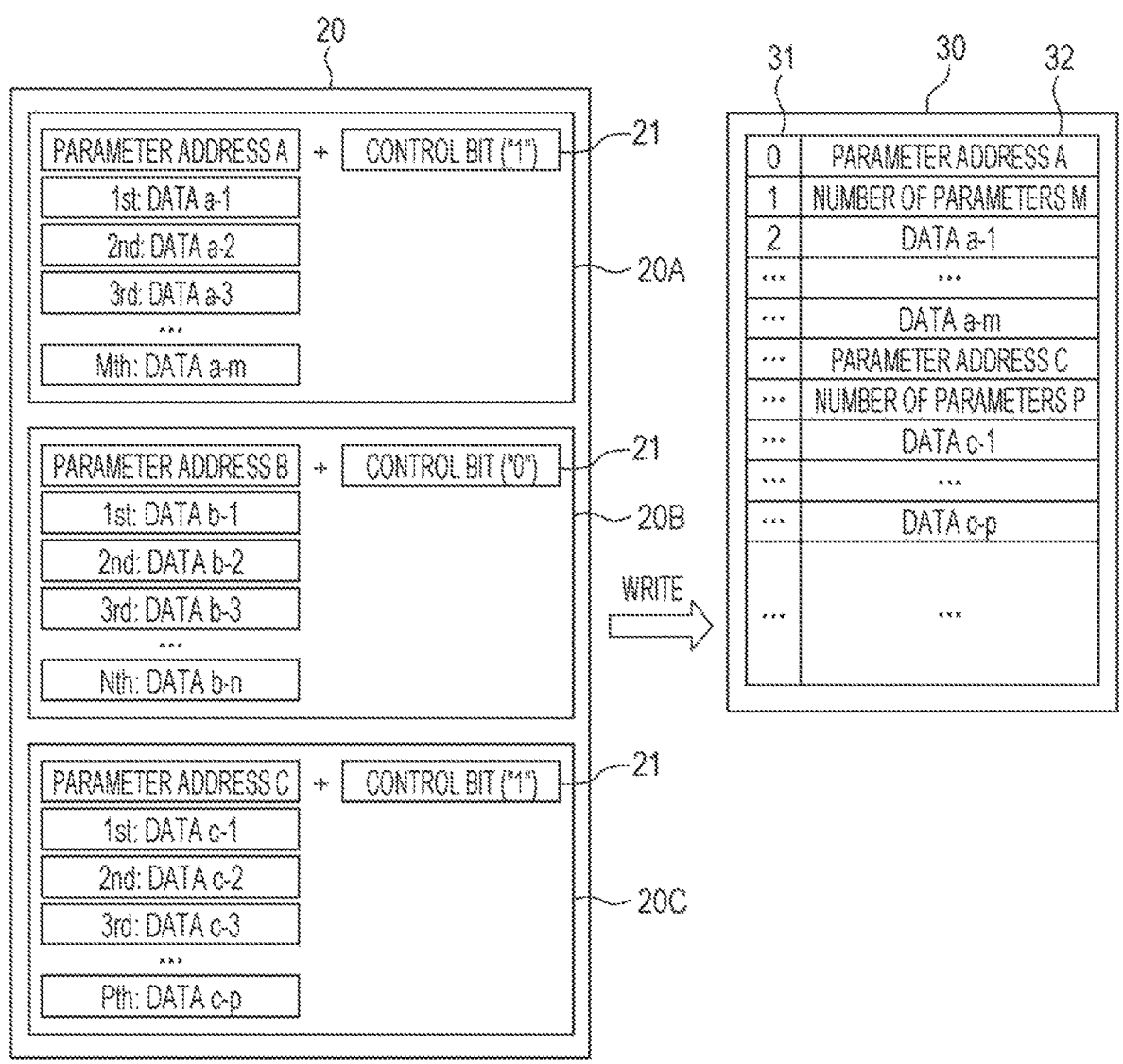
FIG. 2 illustrates a parameter write method in accordance with the first embodiment of the invention.
Figure 3:
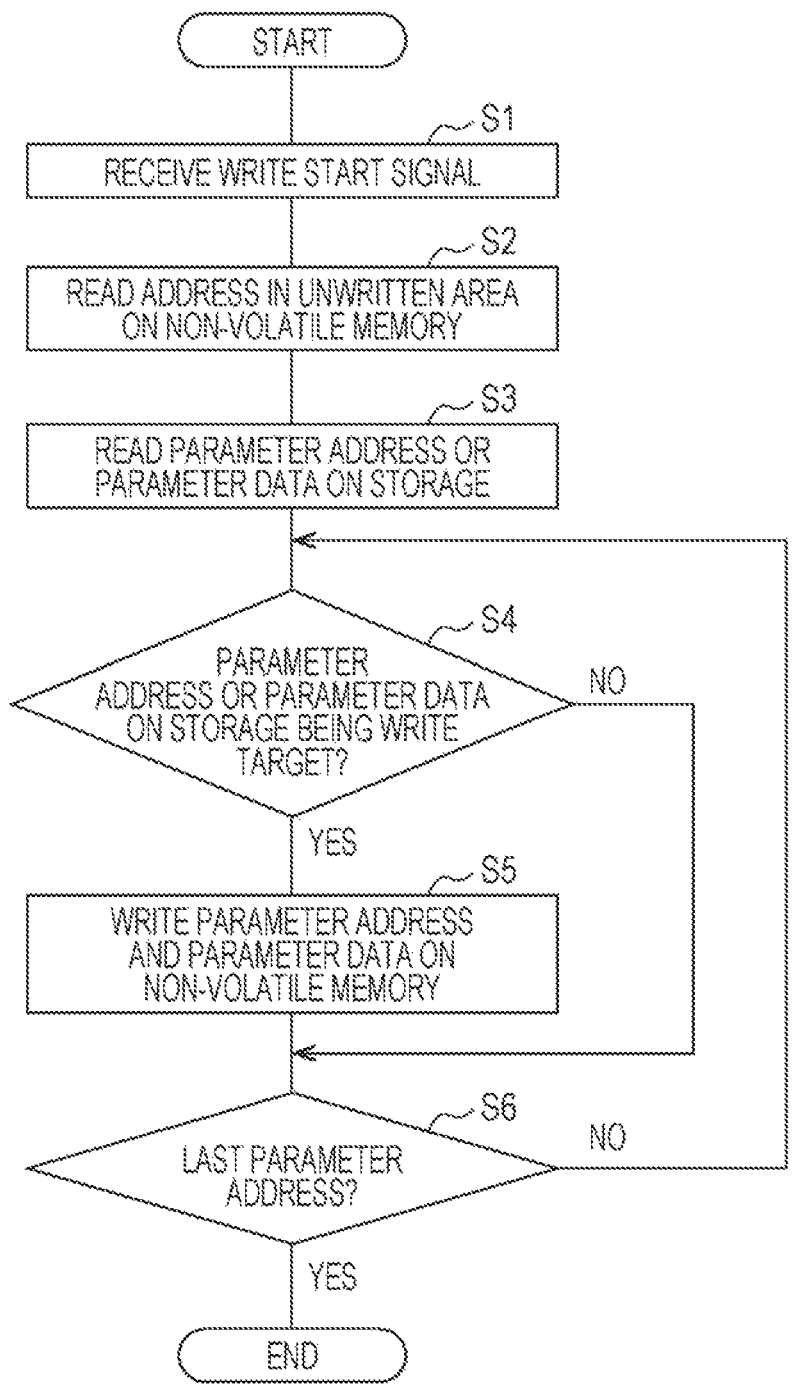
FIG. 3 is a flowchart of a parameter write operation in accordance with the first embodiment of the invention.

Referring to FIG. 2, data related to three types of parameters 20A, 20B, and 20C is grouped into parameter addresses A, B, and C and then stored on the storage 20. The storage 20 stores M pieces of parameter data a-1 through a-m that belong to the parameter address A, N pieces of parameter data b-1 through b-n that belong to the parameter address B, and P pieces of parameter data c-1 through c-P that belong to the parameter address C. Control bits 21 to be described later are respectively arranged at the parameter addresses A, B, and C.

[Control Bit]

In accordance with the first embodiment, the control bit 21 that is "0" or "1" is arranged on each of the parameter addresses A, B, and C. The control bit 21 is used to determine whether to write onto the nonvolatile memory 30 the parameter address and parameter data stored on the storage 20. In accordance with the first embodiment, if the control bit 21 is "1", the data is determined to be a write target and if the control bit 21 is "0", the data is determined not to be a write target.

[Nonvolatile Memory]

The nonvolatile memory 30 is a storage device that is able to rewrite data. In accordance with the first embodiment, the parameter addresses A, B, and C and the parameter data a-1 through a-m, b-1 through b-n, c-1 through c-p, and the like stored on the storage 20 are written on the nonvolatile memory 30. In the example in FIG. 2, the parameter addresses A and C that the write data control circuit 14 has determined to be a write target and the parameter data a-1 through a-m and c-1 through c-p are written on the nonvolatile memory 30.

Specifically, if the control bits 21 in the parameter addresses A and C are "1", the parameter data a-1 through a-m and c-1 through c-p belonging to the parameter addresses A and C are written on the nonvolatile memory 30. On the other hand, if the control bit 21 in the parameter address B is "0", the parameter data b-1 through b-n belonging to the parameter address B are not written on the nonvolatile memory 30.

In accordance with the first embodiment, when the parameter addresses A and C are written on the nonvolatile memory 30, the parameter data a-1 through a-m and c-1 through c-p that belong to the parameter addresses A and C, and information on the total number of pieces of the parameter data (in this case, M pieces and P pieces) are written together with the parameter addresses A and C on the nonvolatile memory 30.

In the example in FIG. 2, the M pieces of data, namely, the parameter data a-1 through a-m to correct image data are stored at the parameter address A. The N pieces of data, namely, the parameter data b-1 through b-n for an unused function are stored at the parameter address B. Since the parameter address B stores a parameter for the unused function, it is noted that the parameter address B is write-free.

In accordance with the first embodiment, the writing of the parameter for the unused function the nonvolatile memory 30 may be disabled by setting the control bit 21 arranged at the write-free parameter address B to be "0".

In this way, the write operation to write on the nonvolatile memory 30 a parameter free from updating and a parameter for the unused function is thus minimized. During the load operation as well, the operation to write on the nonvolatile memory 30 the parameter free from updating and the parameter for the unused function is minimized.

In the load operation, the addresses 31 on the nonvolatile memory 30, namely, data stored from address "0" to the last address, are successively read onto the storage 20. In this case, data later in the layout order of the addresses 31 is later data. In the procedure of successive reading, the latest data is eventually reflected in a "parameter data storage circuit". It is noted that the load operation stops in the unused area of the memory.

[Parameter Write Operation]

A parameter write operation by the control apparatus 1 is described with reference to a flowchart in FIG. 3. The flowchart in FIG. 3 is described for exemplary purposes only, and the parameter write operation is not limited to the flowchart in FIG. 3.

Upon receiving the write start signal Sig1 (step S1), the sequence control circuit 11 instructs the memory information determination circuit 15 to retrieve the addresses 31 in the unwritten area on the nonvolatile memory 30.

Via the memory information determination circuit 15, the address control circuit 12 performs an address reading step to read the addresses 31 in the unwritten area on the nonvolatile memory 30 (step S2).

The address control circuit 12 instructs the write data control circuit 14 to read the parameter address or the parameter data on the storage 20. In accordance with the first embodiment, the write data control circuit 14 performs a parameter reading step to read the parameter address on the storage 20 (step S3).

In succession, the write data control circuit 14 performs a write determination step to determine whether the parameter address on the storage 20 is a write target (step S4). In accordance with the first embodiment, the parameter address on the storage 20 is read in step S3 and the determination as to whether the read parameter address is the write target is made in step S4.

Specifically, if the control bit 21 in the parameter address is "1", the write data control circuit 14 determines that the corresponding parameter address is a write target. On the other hand, if the control bit 21 in the parameter address is "0", the write data control circuit 14 determines that the corresponding parameter address is not a write target (see FIG. 2).

If the write data control circuit 14 determines that the parameter addresses A and C are the write targets (step S4: Yes), the write data control circuit 14 retrieves information on the addresses 31 in the unwritten area on the nonvolatile memory 30 from the memory information determination circuit 15 and performs a write step to write the parameter addresses A and C and the parameter data a-1 through a-m and c-1 through c-p at the addresses 31 in the unwritten area on the nonvolatile memory 30 (step S5). In the writ step S5 in the first embodiment, information on the total number of pieces of the parameter data (in this case, M pieces and P pieces) is written as the addresses 31 in the unwritten area on the nonvolatile memory 30.

If the write data control circuit 14 determines that the parameter address B is not a write target (step S4: No), the write data control circuit 14 does not write the parameter address B on the nonvolatile memory 30 and proceeds to step S6.

In succession, the write data control circuit 14 determines whether the parameter address read in step S3 is the final parameter address on the storage 20 (step S6).

If the read parameter address is not the last parameter address (step S6: No), the write data control circuit 14 returns to the write determination step (step S4) to determine whether the next parameter address is a write target. On the other hand, if the read parameter address is the last parameter address (step S6: Yes), the write data control circuit 14 ends the parameter write operation.

In accordance with the control method of the control apparatus 1, if the control bit 21 is "0" at the update-free parameter address B, the write operation of a parameter 20B from the storage 20 to the nonvolatile memory 30 is not performed. This precludes the writing of the update-free parameter 20B and reduces the parameter write operation time. In this way, the operation performed between the storage 20 and the nonvolatile memory 30 is simplified.

Second Embodiment

A control method of the control apparatus 1 according to a second embodiment is described below with reference to FIGS. 1, 3, and 4. The second embodiment is different from the first embodiment in that the control bit 21 is arranged on each piece of the parameter data in the second embodiment. For convenience of description, elements having the same functions as the elements described with reference to the first embodiment are designated with the same reference numerals and the discussion thereof is omitted as appropriate.

[Control Apparatus]

In accordance with the second embodiment, the address control circuit 12 in the control circuit 10 provides an instruction to the write data control circuit 14 to read the parameter data on the storage 20.

The write mode determination circuit 13 instructs the address control circuit 12 to specify a write target. In accordance with the second embodiment, the parameter data on the storage 20 is specified to be the write target. It is noted that the write target may be determined by the user operation settings.

The write data control circuit 14 retrieves information on the addresses 31 in the unwritten area on the nonvolatile memory 30 from the memory information determination circuit 15. In response to the instruction from the address control circuit 12, the write data control circuit 14 reads the parameter data from within the storage 20 and determines whether the read parameter data is a write target.

The memory information determination circuit 15 transmits the addresses 31 in the unwritten area on the nonvolatile memory 30 to the write data control circuit 14 via the address control circuit 12.

[Storage]

Figure 4:
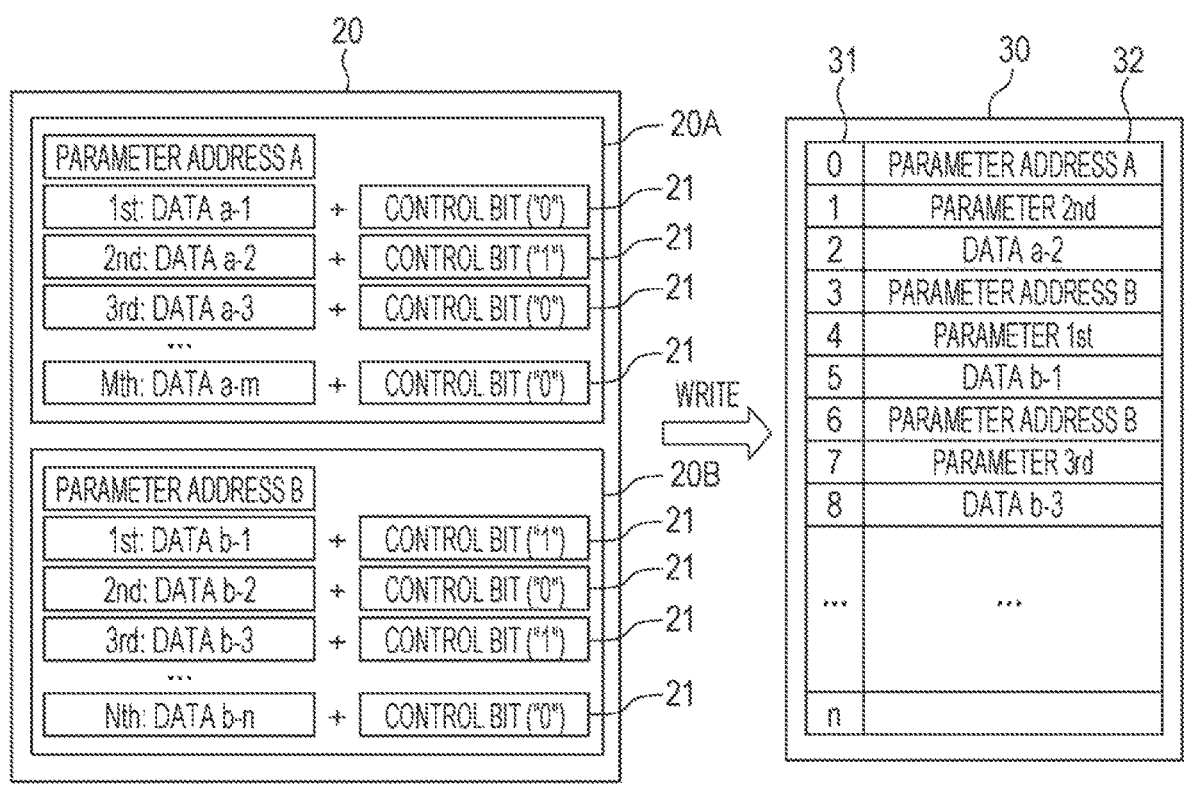
FIG. 4 illustrates a parameter write method in accordance with a second embodiment of the invention.

Referring to FIG. 4, the storage 20 stores data related to two types of parameters, namely, parameters 20A and 20B. Specifically, M pieces of parameter data a-1 through a-m belonging to the parameter address A are stored on the storage 20 while N pieces of the parameter data b-1 through b-n belonging to the parameter address B are stored on the storage 20. Each piece of the parameter data a-1 through a-m and b-1 through b-n includes the control bit 21 to be discussed below.

[Control Bit]

In accordance with the second embodiment, each piece of the parameter data includes the control bit 21 that is "0" or "1". The control bit 21 is used to determine whether the parameter data a-1 through a-m and b-1 through b-n stored on the storage 20 is to be written on the nonvolatile memory 30. In the second embodiment in the same manner as in the first embodiment, the parameter data a-2, b-1, and b-3 corresponding to the control bit 21 being "1" are determined to be write targets and the parameter data a-1, a-3, and b-2 corresponding to the control bit 21 being "0" are determined not to be write targets.

[Nonvolatile Memory]

The data written on the nonvolatile memory 30 in the second embodiment includes the parameter data that the write data control circuit 14 has determined to be the write target, namely, the parameter data with the control bit 21 being "1", the parameter address of the parameter data, and the layout order of the parameter data. The layout order of the parameter data indicates how high the parameter data is located from the top of a parameter layout.

In the example in FIG. 4, the parameter data a-2 having the control bit 21 being "1", the parameter address A, and layout order parameter 2nd of the parameter data a-2 are written on the nonvolatile memory 30. Likewise, the parameter data b-1, the parameter address B, the layout order parameter 1st of the parameter data b-1 and the parameter data b-3, the parameter address B, the layout order parameter 3rd of the parameter data b-3 are written on the nonvolatile memory 30.

In contrast, the parameter data having the control bit 21 being "0" is not written on the nonvolatile memory 30. In the example in FIG. 4, the parameter data a-1 having the control bit 21 being "0", the parameter address A, and the layout order parameter 1st of the parameter data a-1 are not written on the nonvolatile memory 30.

In this way, if the parameter data a-2, b-1, and b-3 being write targets and the parameter data a-1, a-3, and b-2 not being write targets coexist, the writing of the update-free parameter data a-1, a-3, and b-2 on the nonvolatile memory 30 is precluded.

[Parameter Write Operation]

A parameter write operation performed by the control apparatus 1 of the second embodiment is described with reference to FIG. 3. The parameter write operation of the second embodiment is different from the first embodiment in that in the second embodiment the parameter data is read from within the storage 20 in step S3 and a determination as to whether the read parameter data is a write target is made in step S4.

Upon receiving the write start signal Sig1 (step S1), the sequence control circuit 11 instructs the memory information determination circuit 15 to retrieve the addresses 31 in the unwritten area on the nonvolatile memory 30.

Via the memory information determination unit 15, the address control circuit 12 performs an address reading step to read the addresses 31 in the unwritten area on the nonvolatile memory 30 (step S2). In succession, the address control circuit 12 performs a parameter reading step to read the parameter data on the storage 20 onto the write data control circuit 14 (step S3).

In succession, the write data control circuit 14 performs a write determination step to determine whether the parameter data on the storage 20 is a write target (step S4). Specifically, if the control bit 21 in the parameter data is "1", the write data control circuit 14 determines that the corresponding parameter data is a write target. On the other hand, if the control bit 21 in the parameter data is "0", the write data control circuit 14 determines that the corresponding parameter data is not a write target. (see FIG. 4).

If it is determined that the parameter data a-2, b-1, and b-3 are write targets (step S4: Yes), the write data control circuit 14 retrieves information on the addresses 31 in the unwritten area on the nonvolatile memory 30 from the memory information determination circuit 15 and performs a write step to write the parameter data a-2, b-1, and b-3 and the parameter addresses A and B at the addresses 31 in the unwritten area on the nonvolatile memory 30 (step S5).

In the write step S5 of the second embodiment, the write data control circuit 14 further writes information on the layout order parameters 2nd, 1st, and 3rd of the parameter data a-2, b-1, and b-3 at the addresses 31 in the unwritten area on the nonvolatile memory 30.

On the other hand, if the write data control circuit 14 determines that the parameter data a-1, a-3, and b-2 are not write targets (step S4: No), the write data control circuit 14 proceeds to step S6 without writing the parameter data a-1, a-3, and b-2 on the nonvolatile memory 30.

In succession, the write data control circuit 14 determines whether the parameter address to which the parameter data read in step S3 belongs is the last parameter address on the storage 20 (step S6).

If the parameter address is not the last parameter address (step S6: No), the write data control circuit 14 returns to the write determination step to determine whether the parameter data belonging to the next parameter address is a write target (step S4). On the other hand, if the parameter address is the last parameter address (step S6: Yes), the write data control circuit 14 ends the parameter write operation.

The control method of the control apparatus 1 of the second embodiment provides the same results as those of the first embodiment. In particular, when the number of pieces of the parameter data serving as the write target is smaller than the total number of pieces of the parameter data, the writing of the parameter data not serving as the write target may be effectively reduced.

Third Embodiment

Figure 5:
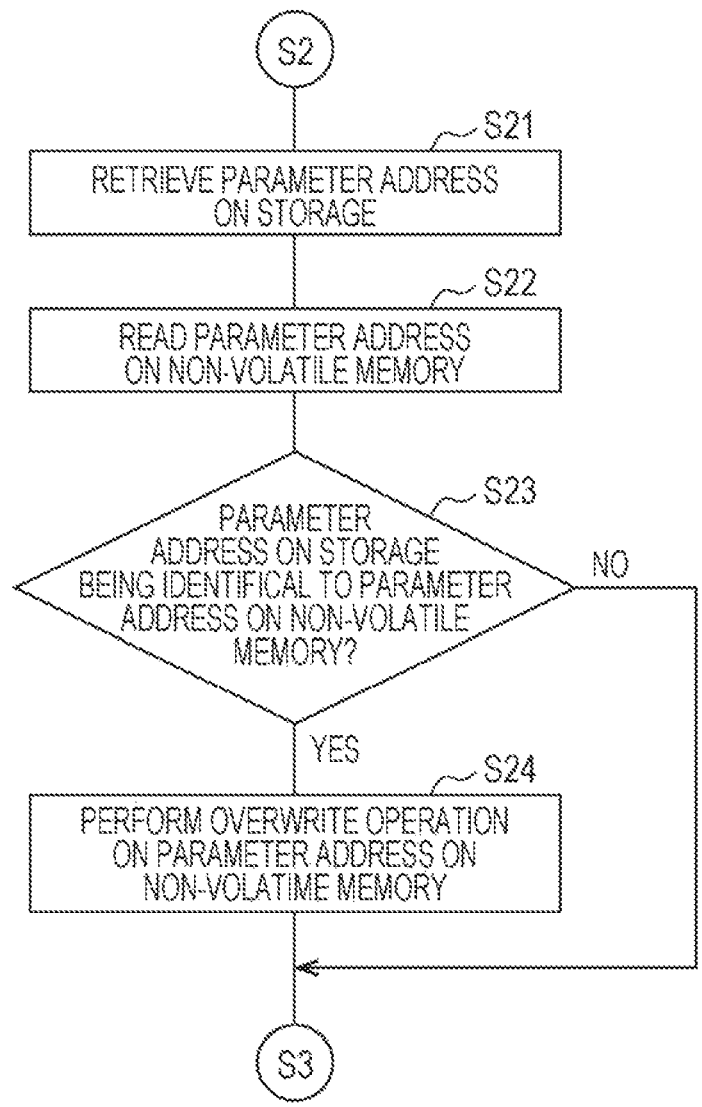
FIG. 5 is a flowchart illustrating a parameter write operation in accordance with a third embodiment of the invention.
Figure 6:
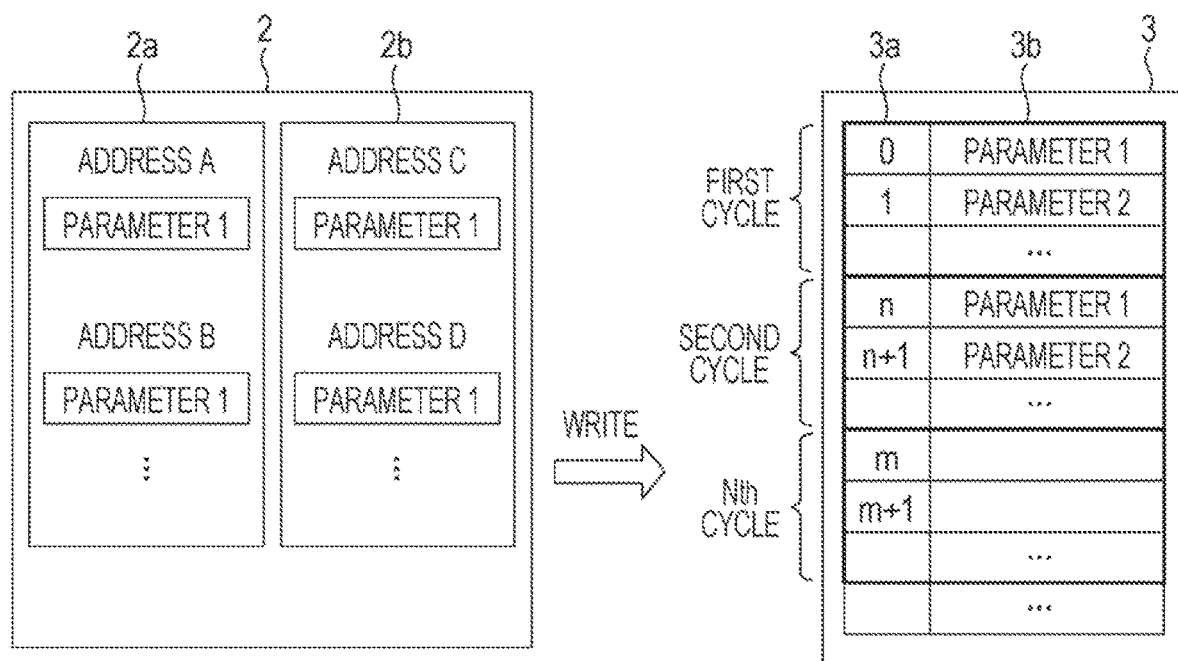
FIG. 6 illustrates a parameter write method of a control apparatus of related art.

A control method of a control apparatus of a third embodiment is described with reference to FIG. 5. The control apparatus 1 of the third embodiment is different from the control apparatus 1 of the first embodiment in that an overwrite operation is performed on the parameter address on the nonvolatile memory 30. For convenience of description, elements having the same functions as those of the embodiments described above are designated with the same reference numerals and the discussion thereof is not repeated.

[Control Circuit]

In response to the reception of an instruction from the sequence control circuit 11, the address control circuit 12 in the control apparatus 1 reads the parameter address stored on the nonvolatile memory 30. If the parameter address read from the nonvolatile memory 30 is an already written parameter address, the overwrite operation is performed on the location of the corresponding parameter address on the nonvolatile memory 30.

In response to an instruction from the address control circuit 12, the write data control circuit 14 reads the parameter address from the storage 20 and then transmits the information on the parameter address to the address control circuit 12. Based on the information on the parameter address on the storage 20, the address control circuit 12 determines whether the read parameter address stored on the nonvolatile memory 30 is the already written parameter address.

[Parameter Write Operation]

The parameter write operation of the control apparatus 1 of the third embodiment is described with reference to FIG. 5. The flowchart in FIG. 5 is described for exemplary purposes only, and the parameter write operation is not limited to the flowchart in FIG. 5.

Upon receiving the write start signal Sig1 (step S1), the sequence control circuit 11 instructs the memory information determination circuit 15 to retrieve the addresses 31 in the unwritten area on the nonvolatile memory 30. Via the memory information determination circuit 15, the address control circuit 12 performs an address reading step to read the addresses 31 in the unwritten area on the nonvolatile memory 30 (step S2).

The write data control circuit 14 retrieves the parameter addresses A, B, and C (see FIG. 2) from within the storage 20 (step S21). In succession, the write data control circuit 14 reads the parameter address stored on the nonvolatile memory 30 via the address control circuit 12 (step S22).

The write data control circuit 14 performs an overwrite determination step to determine whether the parameter address stored on the storage 20 is identical to the parameter address on the nonvolatile memory 30 (step S23).

If the write data control circuit 14 has determined that the parameter address stored on the storage 20 is identical to the parameter address on the nonvolatile memory 30 (step S23: Yes), the write data control circuit 14 performs an overwrite operation (overwrite step) on the parameter address on the nonvolatile memory 30 (step S24). In the overwrite step S24, the write data control circuit 14 overwrites the parameter address on the nonvolatile memory 30 with a predetermined value, namely, "00".

In the overwrite operation of the third embodiment, for example, the location storing the parameter address of the data 32 on the nonvolatile memory 30 identical to the parameter address on the storage 20 is overwritten with "00". If the location storing the parameter address of the data 32 is overwritten with "00", the reading of the corresponding parameter address is skipped when the identical parameter address on the nonvolatile memory 30 is read. Specifically, with "00" written at the location storing the parameter address of the data 32, the load operation to all the parameter data belonging to the parameter address is skipped by following "00" as a sign and the transmission of the parameter data to the storage 20 is thus precluded. In this way, the time for the load operation is reduced. This is because the address having "00" basically indicates NOP (Non Operation) on the storage 20 in the display driver IC.

If it is determined in step S23 that the parameter address on the storage 20 is not identical to the parameter address on the nonvolatile memory 30 (step S23: No), or subsequent to step S24, the operation proceeds to step S3 (see FIG. 3).

In accordance with the control method of the control apparatus 1 of the third embodiment, when the parameter data is read from the nonvolatile memory 30 onto the storage 20, the same parameter address is precluded from being overwritten multiple times. In this way, the load operation to load old data of the parameter that has been written multiple times is reduced. The operation performed between the storage 20 and the nonvolatile memory 30 is thus simplified.

The invention is not limited to the embodiments described above. A variety of modifications is possible to the embodiments within the scope defined by the claims. An embodiment resulting from combining technical means disclosed in each of the different embodiments falls within the technical scope of the invention. Further, combining technical means disclosed in the embodiments may form a new technical feature.

REFERENCE SIGNS LIST

1 Control apparatus
10 Control circuit
11 Sequence control circuit
12 Address control circuit
13 Write mode determination circuit
14 Write data control circuit
15 Memory information determination circuit
20 Storage
21 Control bit
30 Nonvolatile memory
31 Address
32 Data
20A, 20B, and 20C Parameters
A, B, and C Parameter addresses
a-1 through a-m, b-1 through b-n, and c-1 through c-p Parameter data

What is claimed is:

1. A control apparatus comprising:
a storage that stores a plurality of parameters,
a nonvolatile memory that is rewritable, and
a control circuit that writes on the nonvolatile memory a parameter serving as a write target from among the parameters,
wherein each of the plurality of parameters includes a parameter address indicating a storage location on the storage and one or more pieces of parameter data,
wherein the parameter address or the parameter data includes a control bit that is 0 or 1 which is used to determine whether to write the parameter on the nonvolatile memory,
wherein the control circuit writes the parameter on the nonvolatile memory if the control bit is 1, and
wherein the control circuit does not write the parameter on the nonvolatile memory if the control bit is 0.

2. The control apparatus according to claim 1, wherein the control circuit comprises a write data control circuit and an address control circuit,
wherein the address control circuit reads an address in an unwritten area, on which a parameter is to be written, on the nonvolatile memory and provides to the write data control circuit an instruction to read the parameter on the storage, and
wherein the write data control circuit reads the parameter stored on the storage and if the control bit of the read parameter is 1, the write data control circuit writes the read parameter at the address in the unwritten area on the nonvolatile memory.

3. The control apparatus according to claim 1, wherein the control bit is arranged on each of the parameter addresses included in each of the plurality of parameters,
wherein the control circuit comprises a write data control circuit and an address control circuit,
wherein the address control circuit reads an address in an unwritten area, on which a parameter is to be written, on the nonvolatile memory and provides to the write data control circuit an instruction to read the parameter address on the storage, and
wherein the write data control circuit reads the parameter address on the storage in response to the instruction from the address control circuit and if the control bit of the read parameter address is 1, the write data control circuit writes, at the address in the unwritten area on the nonvolatile memory, the read parameter address, the parameter data, and a total number of the pieces of the parameter data.

4. The control apparatus according to claim 1, wherein the control bit is arranged on each piece of the parameter data,
wherein the control circuit comprises a write data control circuit and an address control circuit,
wherein the address control circuit reads an address in an unwritten area, on which a parameter is to be written, on the nonvolatile memory and provides to the write data control circuit an instruction to read the parameter data on the storage, and
wherein the write data control circuit reads the parameter data on the storage in response to the instruction from the address control circuit and if the control bit of the read parameter data is 1, the write data control circuit writes, at the address in the unwritten area on the nonvolatile memory, the read parameter data, the parameter address, and a layout order of the parameter data.

5. The control apparatus according to claim 3, wherein the address control circuit retrieves the parameter address on the storage via the write data control circuit, and
wherein the write data control circuit determines whether the parameter address on the storage is identical to the parameter address stored on the nonvolatile memory and if the parameter address on the storage is identical to the parameter address stored on the nonvolatile memory, the write data control circuit overwrites the parameter address stored on the nonvolatile memory with a predetermined value.

6. A control method of a control apparatus including a storage that stores a plurality of parameters, a nonvolatile memory that is rewritable, and a control circuit that writes on the nonvolatile memory a parameter serving as a write target from among the parameters, comprising:
- an address reading step of reading an address in an unwritten area, on which a parameter is to be written, on the nonvolatile memory, each of the plurality of parameters including a parameter address indicating a storage location on the storage and one or more pieces of parameter data,
- a parameter reading step of reading the parameter stored on the storage,
- a write determination step of determining with the control circuit, in accordance with a control bit that is 0 or 1 which is used to determine whether to write the parameter on the nonvolatile memory and arranged in the parameter address or the parameter data, whether to write the read parameter at the address in the unwritten area on the nonvolatile memory, and
- a write step of writing, if the control bit is 1, with the control circuit, the parameter read in the parameter reading step onto the nonvolatile memory, and not writing, if the control bit is 0, the parameter read in the parameter reading step onto the nonvolatile memory.

7. The control method according to claim 6, wherein the control circuit comprises a write data control circuit and an address control circuit,
- wherein in the address reading step, the address in the unwritten area, on which a parameter is to be written, on the nonvolatile memory is read onto the address control circuit,
- wherein in the parameter reading step, the address control circuit causes the write data control circuit to read the parameter on the storage, and
- wherein in the write determination step, if the control bit is 1, the write data control circuit writes at the address on the nonvolatile memory the parameter address read in the parameter reading step.

8. The control method according to claim 6, wherein the control bit is arranged on each of the parameter addresses included in each of the plurality of parameters,
- wherein the control circuit comprises a write data control circuit and an address control circuit,
- wherein in the address reading step, the address in the unwritten area, on which a parameter is to be written, on the nonvolatile memory is read onto the address control circuit,
- wherein in the parameter reading step, the address control circuit causes the write data control circuit to read the parameter on the storage,
- wherein in the write determination step, if the control bit is 1, a determination as to whether to write the parameter address read in the parameter reading step at the address on the nonvolatile memory is made, and
- wherein in the write step, the read parameter address, the parameter data, and a total number of the pieces of the parameter data are written at the address on the nonvolatile memory.

9. The control method according to claim 6, wherein the control bit is arranged on each piece of the parameter data,
- wherein the control circuit comprises a write data control circuit and an address control circuit,
- wherein in the address reading step, the address in the unwritten area, on which a parameter is to be written, on the nonvolatile memory is read onto the address control circuit,
- wherein in the parameter reading step, the address control circuit causes the write data control circuit to read the parameter data on the storage,
- wherein in the write determination step, if the control bit is 1, the parameter data read in the parameter reading step is written at the address in the unwritten area on the nonvolatile memory, and
- wherein in the write step, the read parameter data, the parameter address, and a layout order of the parameter data are written at the address on the nonvolatile memory.

10. The control method according to claim 8, comprising:
- a parameter address reading step of reading the parameter address written on the nonvolatile memory,
- an overwrite determination step of determining whether the parameter address stored on the storage is identical to the parameter address stored on the nonvolatile memory, and
- an overwrite step of overwriting the parameter address on the nonvolatile memory with a predetermined value if the overwrite determination step has determined that the parameter address stored on the storage is identical to the parameter address stored on the nonvolatile memory.

* * * * *